Dec. 22, 1931.  M. T. WESTON  1,837,803
ELECTRICAL SECTIONAL DRIVE FOR PAPER MACHINES
Filed March 9, 1926  3 Sheets-Sheet 1
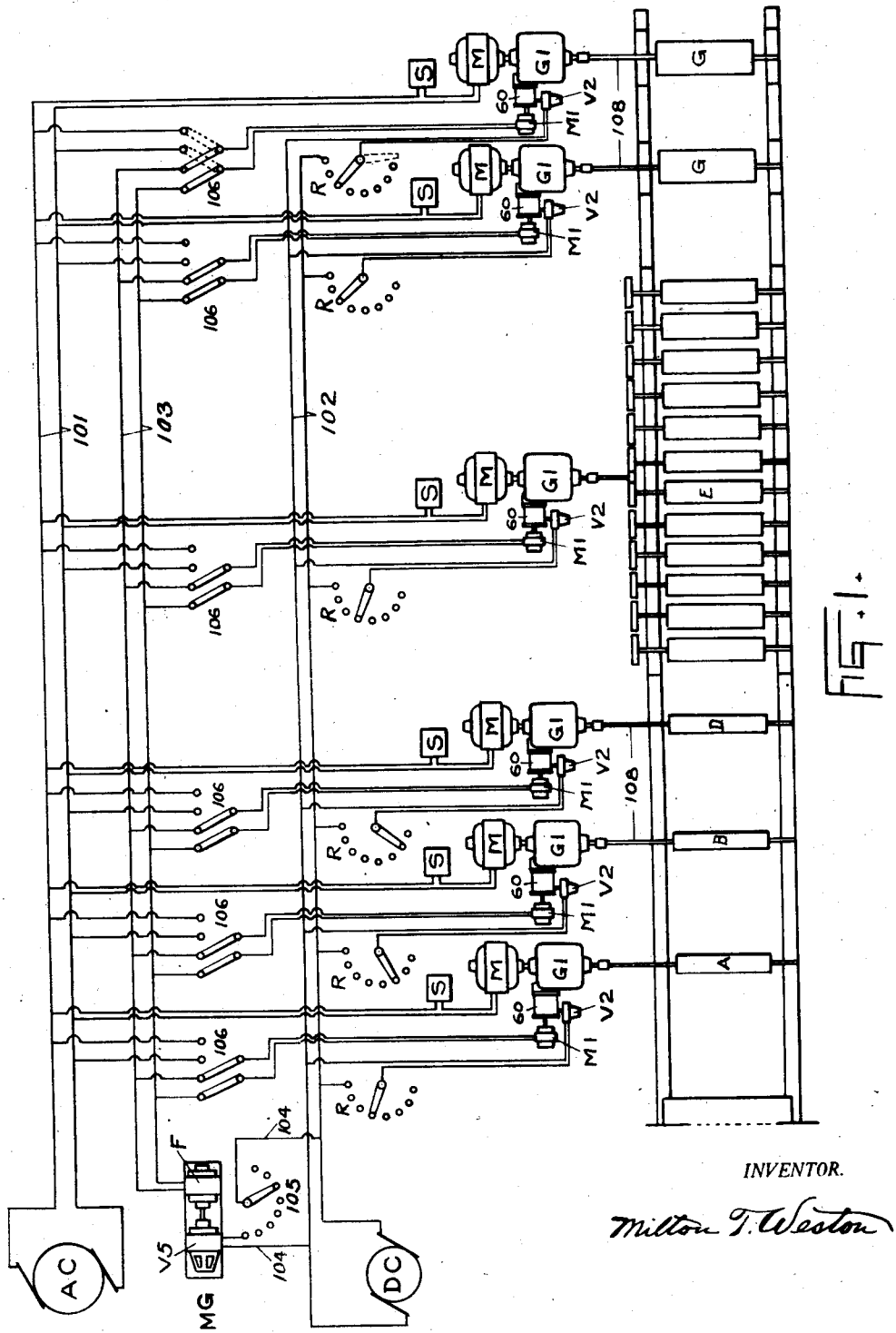
INVENTOR.
Milton T. Weston

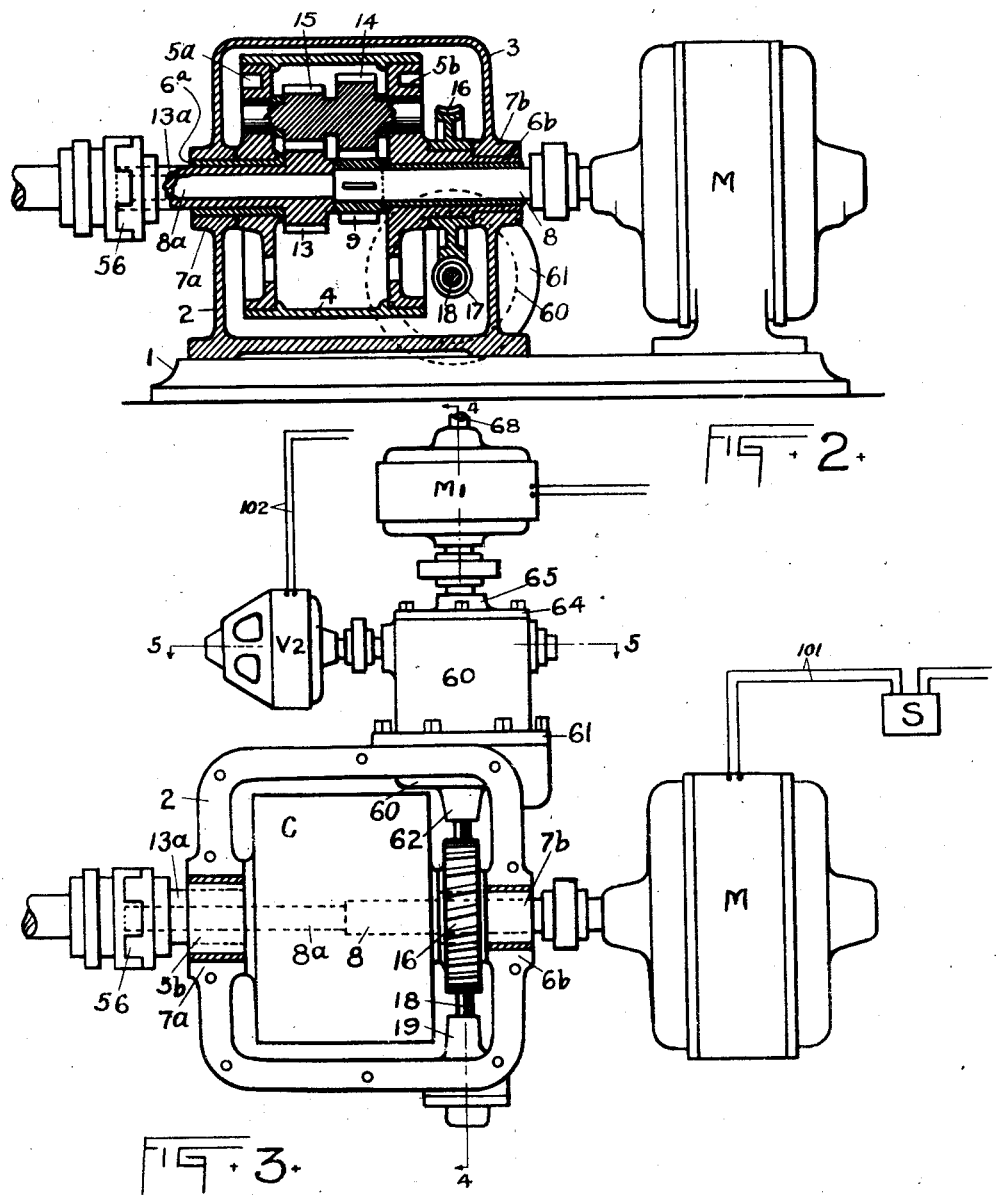

INVENTOR.
Milton T. Weston

Patented Dec. 22, 1931

1,837,803

UNITED STATES PATENT OFFICE

MILTON T. WESTON, OF NEW YORK, N. Y.

ELECTRICAL SECTIONAL DRIVE FOR PAPER MACHINES

Application filed March 9, 1926. Serial No. 93,433.

My invention relates to paper-making machines employing individual motors for separately driving the several sections thereof.

The main general object of my invention is to provide an improved combination and arrangement of separately controllable individually driven variable speed driving units for the several sections of a paper-making machine according to which the relative speeds of the machine sections may be accurately and easily adjusted as well as the speed of the entire machine changed without altering the relative speeds of the several sections.

One of the objects of my invention is to provide an improved electrically-operated sectional drive for paper-machines of the character shown and described in U. S. Patent No. 1,594,396 granted to me under date of August 3, 1926.

More especially, the present invention contemplates an improved electrical sectional drive for paper-making machines whereby machines of this character may be more effectively controlled during the starting, accelerating and retarding operations; whereby the several sections may be electrically locked together while the speed of the entire machine is changed; and whereby the necessary adjustments for "draw" may be made between the several sections of the paper machine in a more effective manner.

Another object of the present invention is to provide an improved electrical system for cooperatively controlling the several sections of a paper machine in which separate synchronous motors are connected up thru positively geared variable speed mechanisms such, for example, as those shown and described in my above-identified U. S. patent.

Another object of my invention is to provide improved means for controlling the operation of variable speed drive units of the character shown and described in my above-identified U. S. patent.

In the specific adaptation of my invention shown on the drawings and hereinafter described, my invention contemplates an improved electrical control of variable speed drive units according to which a variable speed factor may be introduced into each of a plurality of constant speed operations of the variable speed devices interposed between a driving and a driven part.

Other and further objects will appear in the specification and be pointed out in the appended claims, reference being had to the accompanying drawings which show a preferred embodiment of my invention.

In the drawings,

Figure 1 is a schematic diagram of a paper-making machine comprising sectional drive units and provided with suitable electric circuits for controlling the motors of said drive units.

Figure 2 is an axial section of one of the main power transmission units, said section corresponding to the line 2—2 of Figure 4, parts being broken away and parts shown in section.

Figure 3 is a top plan view of the same with the cover removed, this view corresponding to the line 3—3 of Figure 4.

Figure 4:
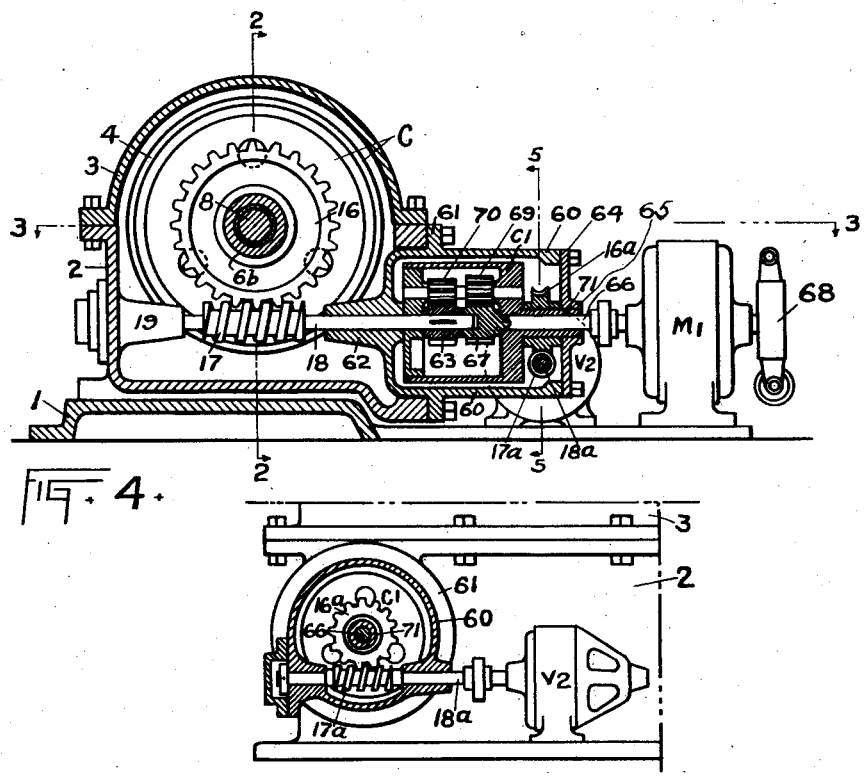
Figure 4 is a vertical section corresponding to the line 4—4 of Figure 3.

In the specific adaptation of my invention to the paper making machine shown in my above-identified U. S. Patent No. 1,594,396, the present application contemplates the substitution of synchronous control motors for the variable speed control motors $v_1$ and in connection with the synchronous control motor, the provision of a master control circuit therefor.

Referring more particularly to Figures 2, 3, 4, and 5 of the drawings, in the present embodiment of my invention, each power-transmitting unit includes a base 1 on which is mounted a casing comprising a bottom section 2 and a removable cover section 3. In this casing is mounted a revolvable cage C comprising a cylindrical shell 4 and two end discs $5^a$ and $5^b$ secured in opposite ends of said cylindrical shell. Each of the end discs $5^a$ and $5^b$ has a hollow trunnion $6^a$ and $6^b$ projecting axially and mounted to revolve in suitable bearings 7ª and 7ᵇ formed partly in section 2 and partly in section 3 of said casing. A driving shaft 8 is mounted to revolve in the hollow bore of the trunnion 6ª and carries a driving pinion 9 keyed to it within the cage C. As shown in Figures 2 and 3, the driving shaft 8 is directly connected to a main driving motor M which is of the synchronous or constant speed type and mounted on the base 1. Within the revolving cage C, a spur pinion 9 keyed to shaft 8 is coaxially arranged with respect to a driven gear 13 and connected thereto by planetary gears 14 and 15. Said driven gear 13 is provided with an extended sleeve hub 13ª which is journalled freely upon the reduced portion 8ª of said driving shaft within hollow trunnions 6ª of the end disc 5ª. Parallel to the axis of the cage C and at equal distances therefrom the planetary gears 14 and 15 are arranged in three clusters to rotate in suitable bearings in the end discs 5ª and 5ᵇ of the revolving cage C. In operation, the driving pinion 9, cluster gears 14 and 15, and driven gear 13, function as a simple speed reducer when the cage C is held so as not to revolve, i. e. the extended sleeve hub 13ª will have a fixed reduced speed with respect to the driving shaft 8. Revolving the cage in either direction, however, introduces a variation in the speed of the sleeve hub 13ª with respect to its normal reduced speed when the cage is fixed. When the cage C is revolved in the same direction as the driving shaft 8, the speed of the sleeve hub 13ª is increased at a rate which is proportional to the speed of the cage. When the cage C is revolved in the direction opposite to the direction of rotation of the driving shaft 8, the speed of the sleeve hub 13ª will be reduced in proportion to the speed of the cage. When a certain speed of counter rotation of the cage C is reached, the sleeve hub 13ª will remain stationary and any further increase in the speed of counter rotation will cause the sleeve hub 13ª to rotate backwardly or oppositely to its normal direction of rotation.

For controlling the revolutions of the cage C, a worm wheel 16 may be keyed to the trunnion 6ᵇ to mesh with a worm 17 on a transverse shaft 18.

*Variable speed mechanism control*

Referring more especially to Figure 4, it will be seen that the shaft 18 which carries the main holding or controlling worm 17, is journalled at one end in a bearing 19 carried by the casing 2, the other end of said shaft being journalled in a bearing 62 in the adjacent end of a cylindrical housing 60. The housing 60 is provided with a flange 61 which is bolted to the casing 2 around the edges of an opening in said casing. Keyed to the outwardly-presented end of shaft 18, is a driven gear 63. A cap 64 bolted to the outer end of housing 60, carries a bearing 65 within which is journalled a hollow trunnion 71 which projects from one end of a planetary support or cage C¹, the other end of said cage being journalled upon the shaft 18 which carries the worm 17. A driving shaft 66 which is journalled within the trunnion 71 is arranged in axial alignment with the worm shaft 18 but is rotatable relatively thereto. Said shaft 66 whch carries a spur gear 67, has its outer end coupled directly to a small synchronous motor M¹. Under certain conditions to be hereinafter referred to, said shaft 66 may be driven by motor M¹ or may be held stationary by an electromagnetic brake 68 which is arranged to operate upon the projecting end of the armature shaft of said motor M¹. For this purpose, a coil 68ª for said magnetic brake may be arranged in series with the motor M¹ in such a way that the armature shaft may be released whenever the energizing current is turned on and immediately locked against movement as soon as the current is turned off. Arranged within the planetary support or cage C¹, are clusters of planetary gears 69 and 70 which form a variable speed connection between driving gear 67 and driven gear 63.

Figure 5:
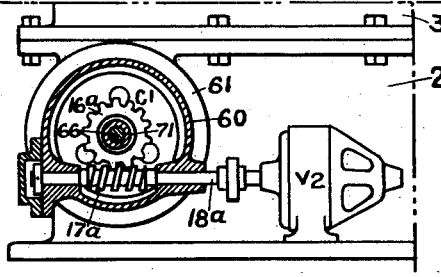
Figure 5 is a section corresponding to the line 5—5 of Figure 3.

Secured to the outer end of trunnion 71 which turns in the bearing 65 on cap 64, is a worm wheel 16ª which meshes with a worm 17ª on the worm shaft 18ª, the latter shaft extending transversely through the housing 60. The outer end of the worm shaft 18ª is directly connected to a small variable speed motor $v^2$ as shown in Figures 1, 3 and 5.

Figure 6:
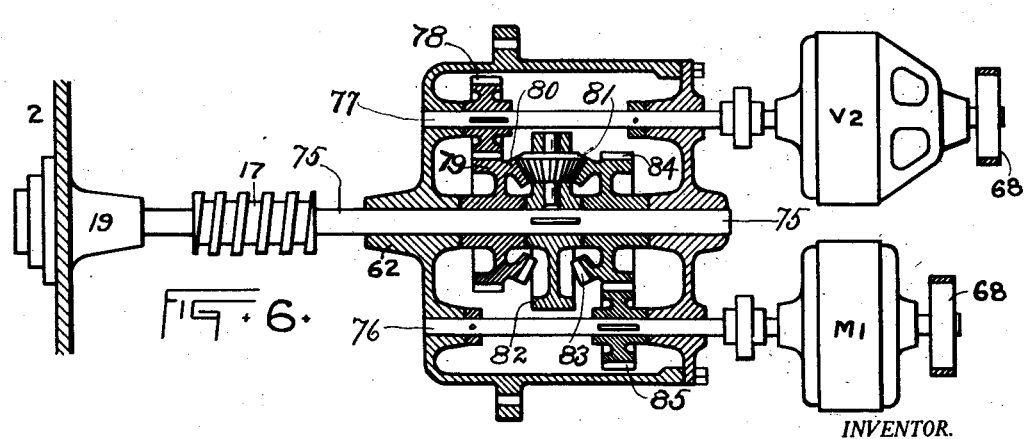
Figure 6 is a horizontal section of a modified form of the variable speed control mechanism, the variable speed and synchronous control motors being shown in plan.

It will be understood that while I show the epicyclic form of differential gearing on account of its reliable and simple construction, any form of differential gearing may be used for the purpose, such, for example, as the differential gearing shown in Figure 6.

According to the modification shown in Figure 6, the variably-driven worm-shaft 75 is arranged parallel to and between the shafts 76 and 77 which are respectively driven by the small synchronous motor M¹ and variable speed motor $v^2$. Said shafts 76 and 77 are provided with magnetic brakes 68, 68, whereby the shafts are positively locked whenever motors $v^2$ and M¹ are deenergized. Keyed to shaft 77 is a spur gear 78 which meshes with the spur-gear portion 79 of a compound gear which is freely journalled upon the shaft 75. The bevel gear portion 80 of said compound gear meshes into planetary bevel gears 81, the last-mentioned gears being journalled on radial axes within a spider 82 which is keyed to the worm-shaft 75. Also meshing with the planetary bevel gears 81 is the bevel gear portion 83 of a second compound gear of which the spur-gear portion 84 meshes into a driving spur-pinion 85 keyed to synchronous motor shaft 76. The last-mentioned compound gear is also freely journalled upon worm-shaft 75.

Referring to Fig. 1 in my present application, A is the couch roll, B the first press, D the second press, E the dryer section (only one section being shown) and G. are the two calender sections. Each of these sections is driven through a variable speed device G.1 by the main driving synchronous motors M. Each of the variable speed devices G.1 are controlled by an auxiliary variable speed device enclosed in a cylindrical housing 60, the said auxiliary variable speed device having a dual motor control consisting of a variable speed direct current motor V.2 operating one of the variable speed elements and a synchronous alternating current motor M.1 (instead of variable speed motor V.1 in copending application) operating another of the variable speed elements. The two motors M.1 and V.2 operate either independently or together to control a third element in the auxiliary variable speed device. This third element directly controls the operation of the main variable speed device G.1 to vary the speed of the corresponding machine section. All of this is thoroughly described and explained in my copending application.

The main synchronous driving motors M. are supplied with alternating current from a generator AC, through the circuit 101. A starter S is provided for each of the said motors M.

The variable speed direct current control motors V.2 are supplied with current from a direct current source DC through a circuit 102. Each control motor V.2 is provided with a rheostat R.

The synchronous control motors M.1 are connected through the circuit 103 with a master motor-generator set MG which is designed to supply only the current necessary for these motors. The master motor-generator set MG comprises a direct current variable speed motor V.5 connected to any direct current source of power as DC through circuit 104 with a rheostat 105 by which the speed of the motor V.5 is controlled. A frequency generator F. is direct connected to the variable speed motor V.5 and thus supplies a current of varying frequency to the synchronous control motors M.1 which follow in absolute unison, the master motor-generator set MG.

It will be seen that I provide switches 106 by means of which each one of the synchronous control motors M.1 can be connected at will to either master circuit 103 or to the main alternating current circuit 101 which supplies current to the main synchronous driving motors M. Reference will be made to this arrangement hereinafter.

In my copending application referred to, the ratio of the gear train between the variable speed motor V.1 and the main variable speed device which it controls is such that when both the driving synchronous motor M. and the variable speed motor V.1 are running at full speed, the intake shaft 108 and consequently the machine section to which it is connected, will remain stationary. In view of the fact that a variable speed motor is subject to uncontrolled variations in speed above or below its nominal rated speed, it may require some time to adjust the variable speed motor V.1 to the correct speed to stop the paper machine section. Furthermore I depend upon these variable speed motors V.1 to vary the speed of the several sections of the paper machine as a whole. The uncontrolled variation in speed just referred to will introduce an undesirable variation in the speed of the several sections of the paper machine.

I introduced the foregoing reference to my copending application in order to bring out clearly the very great advantage and importance of the use, in this application, of synchronous control motors M.1 governed by a master controlling alternating circuit, in place of the variable speed motors V.1, all of which will be obvious in the following description of the operation of my invention.

Referring to Figures 2, 3, and 4, we will assume that all parts are at rest. When it is desired to start any given unit such as one of the calender units G', G' the jaw clutch 56 (which also functions as a flexible coupling) is disengaged and motor M is brought up to full speed by means of a suitable starter represented diagrammatically in Figures 1 and 3. The small auxiliary motor $M^1$ is also brought up to substantially full speed, the ratio of the differential gearing in the cage C' being such that at approximately full speed, the motor $M^1$ will permit the cage C to revolve at the correct speed to cause the sleeve hub 13$^a$, on which one member of the jaw clutch 56 is mounted, to come to rest. The jaw clutch 56 may then be engaged without shock as both halves remain substantially at rest as long as the main motor M and auxiliary motor $M^1$ maintain their relative speeds.

The calender section G of the paper machine may now be started by simply slowing down the speed of the motor $M^1$ which reduces the speed of the cage C and thus gradually applies the load to the main motor M which continues to run at full or synchronous speed. Inasmuch as the worm 17 is designed as a holding worm for restraining the revolution of cage C, no load is thrown on the small motor $M^1$ which has only to overcome the frictional work in the gearing.

It will be understood that while one step in the speed reduction of motor $M^1$ will cause a relatively small increment of change in the speed of the paper machine section, yet, such increment of change is too great to give the necessary degree of regulation for properly adjusting the "draw" in the paper web. In order to secure the necessary refinement in this adjustment, I use a second auxiliary motor $v^2$ which operates upon the same differential gearing as motor $M^1$ but at a relatively greater speed reduction through worm $17^a$ and worm wheel $16^a$. For this reason one step in the controller for small motor $v^2$ will cause a very small change in the paper speed for that section at that point. This small increment of change in speed is superimposed upon the speed produced by the auxiliary motor $M^1$ and is therefore operatable at any and all speeds of motor $M^1$ from zero to full speed, while the main motor M continues to run at its constant or synchronous speed.

A similar starting of the other paper machine sections A, B, D, E, and G may be effected thru the clutch-couplings 56 and the control of variable speed units $G^1$.

With all sections of the machine in operation, a true synchronous tie-in is effected between said sections while at the same time separate relative adjustments in speed may be had in each section.

It will be understood that whenever the smaller synchronous motor $M^1$ is deenergized, a magnetic brake 68 (see Figure 4) may be automatically applied without interfering with the variable speed control of motor $v^2$.

It will be understood furthermore that by employing the above-described positively geared variable speed mechanisms, it becomes possible to accelerate the several sections of a paper-making machine from a condition of rest thru the operating circuits which energize the synchronous motors for individually driving the several sections of paper-making machines of the character described. By means of my improved construction and arrangement, I am able to gradually apply the full power of a synchronous motor M while running at full speed, to each particular section of a paper-making machine in which the several sections are separately driven by means of individual motors respectively connected to said sections. Inasmuch as the starting torque of some sections of a paper-making machine is five times as great as the running torque, it has become customary in some instances to over-motor some sections of a paper machine 100%. It will be seen therefore that in spite of the small starting torque of a synchronous motor, the present invention makes it possible to adapt synchronous motors to the individual drive of the several sections. By accelerating such motors up to full speed before any loads of consequence are thrown upon them and afterwards applying the loads thereto in such a gradual manner as not to lessen the speeds of said motors, great economies may be secured in the manufacture and operation of paper-making machines.

When all sections of the paper machine are in operation at maximum speed, the main driving synchronous motors M. are running at full speed in absolute synchronism or unison, taking power from the main alternating current circuit 101 and all of the synchronous control motors M.1 are stopped. The necessary adjustments for "draw" between the sections of the machine are made by adjusting the speed of the several variable speed motors V.2 by means of the rheostat R., in the manner described fully in my copending application. When it is desired to run the paper machine as a whole at a slower speed, the synchronous control motors M.1 are started by connecting them to the master alternating current circuit 103 by means of the switches 106. As previously described, the frequency of the current in this circuit is varied by varying the speed of the master motor-generator set MG by means of the rheostat 105. The synchronous control motors M.1 will all follow the speed of the master frequency generator in absolute synchronism or unison. Thus any desired speed of the paper machine as a whole is obtained. Since there can be no variation either in the speed of the several main synchronous driving motors M. or in the speed of the synchronous control motors M.1, it is obvious that there can be no variation in the relative speeds of the several sections of the paper machine except that which is imposed independently by the separately controlled variable speed motors V.2 for the purpose of adjusting the "draw" between the several sections. As a total variation in the paper speed of 5% will take care of the necessary "draw" between the several sections of the paper machine and as this 5% variation is distributed over the entire variable speed range of the control motors V.2, it will be evident that a very fine degree of regulation can be obtained depending upon the number of steps in the rheostat R. Since the control motors V.2 have substantially uniform loads, the uncontrolled variation from their rated speeds will be very small and will cause an almost infinitesimal variation in the paper speed which will be negligible.

The importance of the use of main driving synchronous motors M. and synchronous control motors M.1 to drive the several sections of a paper machine at varying speeds but always in positive electrically locked relation, will be evident by comparison with all of the present electrical sectional paper machine drives which without exception, use variable speed direct current motors in conjunction with some type of speed control which is more or less complicated and liable to get out of order and which does not give the close and reliable speed regulation obtained by the use of synchronous motors in my invention.

A paper machine using my sectional drive is started by bringing each section up to the desired speed independently in the following manner. I will describe the method of starting the calender section G. at the extreme right of Fig. 1 which may be regarded as typical of all sections.

The rheostat R. is set in its "off" position as indicated by dotted lines and the variable speed control motor V.2 is at rest. The switch 106 is thrown to the position shown in dotted lines which connects the synchronous control motor M.1 to the main alternating current circuit 101 which supplies the current for the main driving synchronous motors M. which, in practice, will be started simultaneously with synchronous control motors M.1 by means of the starter S. The main driving synchronous motor M. and the synchronous control motor M.1 are now running at full synchronous speed but the ratio of the train of gearing between the synchronous control motor M.1 and the main variable speed device G.1 is such that the calender section to which this drive unit is connected, remains stationary as previously described. Since the main driving synchronous motor M. and the synchronous control motor M.1 are operating in the same alternating circuit it is obvious that they will both run at their full rated synchronous speeds at all times and their speed relation will always be constant.

It will be noted that the main driving synchronous motor M. is thus brought to full speed without load. I now apply the load, that is, start the section of the paper machine by turning the rheostat R. to its first position. This starts the variable speed control motor V.2 very slowly which will introduce a variation in the main variable speed device G.1 and the section of the paper machine will begin to move very slowly—almost imperceptably. The rheostat R. is slowly turned step by step which accelerates the machine section very slowly and gently until the rheostat R. is on full which brings the control motor V.2 up to its maximum speed and the machine section is then running at approximately 5% of its normal speed. The switch 106 is then thrown to the position shown in full lines which connects the synchronous control motor M.1 to the master frequency circuit 103 and the said motor M.1 will then follow the speed of the master motor-generator set MG which determines the speed of the paper machine as a whole.

After each section of the paper machine is started in this manner, the variable speed control motors V.2 are then individually adjusted by means of the rheostats R. to give the correct "draw" in the paper web between the several sections of the paper machine.

Having thus described my invention I claim as new and desire to secure by Letters Patent:

1. In an electrical sectional drive, the combination with a plurality of main driving motors, of auxiliary motors of the synchronous type for respectively controlling the application of loads to said main driving motors, and means for supplying variable frequency currents to said auxiliary synchronous motors as a group.

2. In an electric sectional drive, the combination with a plurality of main driving motors, of a plurality of auxiliary synchronous motors, a fixed frequency alternating current source, a variable frequency alternating current source, and means for connecting all of said auxiliary synchronous motors together in circuit with said fixed frequency alternating current source or in circuit with said variable frequency alternating current source.

3. In an electrical sectional drive, the combination of a plurality of alternating current motors of the synchronous type, a motor-generator set provided with circuit connections for varying the frequency of current delivered by said motor-generator set, an alternating current source adapted to deliver fixed frequency alternating currents, and circuit connections for connecting each of said motors to said motor-generator set or to said fixed-frequency source of alternating currents.

4. In an electric power system, the combination with a plurality of main synchronous motors provided with energizing circuits for operating said motors in synchronism with each other, a plurality of auxiliary synchronous motors for respectively controlling the application of loads to said main synchronous motors, means for supplying variable frequency currents to all of said auxiliary synchronous motors, and means for disconnecting one or more of said auxiliary synchronous motors from said means for supplying variable frequency currents and connecting it or them to the main synchronous motor energizing circuits.

Signed at New York city in the county of New York and State of New York this 8th day of March A. D. 1926.

MILTON T. WESTON.